US009114672B2

(12) United States Patent
Bonacini (10) Patent No.: US 9,114,672 B2
(45) Date of Patent: Aug. 25, 2015

(54) APPLIANCE FOR LOCKING WHEEL RIMS FOR VEHICLES ON REPAIR WORKSHOP MACHINES OR THE LIKE

(71) Applicant: GIULIANO GROUP S.p.A., Correggio (IT)

(72) Inventor: Maurizio Bonacini, Correggio (IT)

(73) Assignee: GIULIANO GROUP S.P.A., Correggio (RE) (IT)

( * ) Notice: Subject to any disclaimer, the term of this patent is extended or adjusted under 35 U.S.C. 154(b) by 370 days.

(21) Appl. No.: 13/773,669

(22) Filed: Feb. 22, 2013

(65) Prior Publication Data

US 2014/0069589 A1   Mar. 13, 2014

(30) Foreign Application Priority Data

Sep. 7, 2012   (IT) .............................. MO2012A0212

(51) Int. Cl.

| | |
|---|---|
| *B60C 25/135* | (2006.01) |
| *B60C 25/132* | (2006.01) |
| *B60C 25/05* | (2006.01) |
| *B60C 25/02* | (2006.01) |
| *B60C 25/01* | (2006.01) |

(Continued)

(52) U.S. Cl.
CPC ............ *B60C 25/0539* (2013.04); *B60C 25/01* (2013.01); *B60C 25/025* (2013.01); *B60C 25/0545* (2013.04); *B60C 25/04* (2013.01); *B60C 25/132* (2013.01); *B60C 25/138* (2013.01)

(58) Field of Classification Search
CPC .... B60C 25/02; B60C 25/025; B60C 25/132; B60C 25/04; B60C 25/138
USPC ................................................ 157/1.17, 1.24
See application file for complete search history.

(56) References Cited

U.S. PATENT DOCUMENTS 4,061,173 A * 12/1977 Daly ............................ 157/1.17
4,196,766 A *  4/1980 Leeper et al. ................ 157/1.26

(Continued)

FOREIGN PATENT DOCUMENTS

| CA | 1 093 955 A | 1/1981 |
|---|---|---|
| EP | 1 518 718 A1 | 3/2005 |
| EP | 1 852 274 A1 | 11/2007 |

OTHER PUBLICATIONS

Italian Search Report, dated Feb. 11, 2013, from corresponding Italian application.

*Primary Examiner* — Monica Carter
*Assistant Examiner* — Danny Hong
(74) *Attorney, Agent, or Firm* — Young & Thompson (57) ABSTRACT

Appliance for locking wheel rims includes: a supporting structure associable with a rotation device of a repair workshop machine; at least two locking jaws for locking a wheel rim, which are associated with the supporting structure and move along a direction of reciprocal moving close/away between a position of maximum opening, and a position of minimum opening; a movement arrangement associated with the jaws for moving them between the positions of maximum and minimum opening; an adjustment device placed between the movement arrangement and at least one of the jaws, for adjusting the position of maximum and/or minimum opening and including a substantially elongated adjustment element associated with the movement arrangement, revolving around its own longitudinal axis and having a threaded portion, and a mobile element associated integral with at least one of the jaws and having a threaded hole for engagement with the threaded portion of the adjustment element.

17 Claims, 7 Drawing Sheets

(51) Int. Cl.
 *B60C 25/138* (2006.01)
 *B60C 25/04* (2006.01)

(56) References Cited

U.S. PATENT DOCUMENTS

| | | | |
|---|---|---|---|
| 4,245,686 A * | 1/1981 | Holladay | 157/1.1 |
| 4,327,794 A * | 5/1982 | Leeper et al. | 157/1.28 |
| D293,916 S * | 1/1988 | Cunningham et al. | D15/199 |
| 4,804,029 A * | 2/1989 | Glogovsky | 157/1.1 |
| 5,490,552 A * | 2/1996 | Vignoli | 157/1.24 |
| 6,056,034 A * | 5/2000 | Matnick | 157/1.24 |
| 6,182,736 B1 * | 2/2001 | Cunningham et al. | 157/1.24 |
| 6,257,299 B1 * | 7/2001 | Toriselli | 157/1.17 |
| 7,343,955 B2 * | 3/2008 | Cunningham | 157/1.24 |
| 8,333,228 B1 * | 12/2012 | Cunningham | 157/1 |
| 8,746,317 B2 * | 6/2014 | Barbetti et al. | 157/1.17 |

* cited by examiner

APPLIANCE FOR LOCKING WHEEL RIMS FOR VEHICLES ON REPAIR WORKSHOP MACHINES OR THE LIKE

FIELD OF THE INVENTION

The present invention relates to an appliance for locking wheel rims for vehicles on repair workshop machines or the like.

BACKGROUND OF THE INVENTION

The use is known of so-called workshop tyre-changing machines which allow fitting and removing tyres onto and off the relative rim of a vehicle wheel, e.g., for carrying out maintenance jobs or replacing the rim and/or the tyre itself.

Such tyre-changing machines generally consist of a base structure supporting means for gripping and placing in rotation the rim of a wheel, having a rim locking spindle, and of at least a tool bearing arm having one or more tools suitable for removing and/or fitting the tyre from and onto the rim.

Different types of means for gripping and placing in rotation the rim of a wheel exist, made up of different types of rim locking spindles.

A particular type of means for gripping and placing in rotation the rim is made up of gripping means for gripping the edge of the rim of the wheel.

These gripping means for gripping the edge of the rim can be composed of, e.g., a so-called spindle with jaw lock.

In particular the spindle with jaw lock consists of a fastening plate for the rim, which is fitted on the base structure of the tyre-changing machine in a rotatable way around a central work axis and which has four gripping jaws of the edge of the rim.

The jaws are fitted on respective supporting slides and move, due to the action of suitable actuators, from the centre towards the outside of the plate and vice versa, between a closing configuration, corresponding to the positioning of the jaws at the centre of the plate, and an opening configuration, corresponding to the positioning of the jaws at the periphery of the plate.

In particular, the jaws can be used so as to engage on the edge of the rim both from the outside and the inside.

Once moved to the grip position, the jaws are engaged in correspondence to respective sections of the edge of the rim, so as to lock the rim itself onto the plate.

The need is also known to make a further adjustment of the position of the jaws, irrespective of the adjustment commonly made by means of the actuators, so as to also allow the use of the spindle for rims of different dimensions.

In particular, the use is increasingly more common and widespread of rims with greater diameter compared to the rims of conventional type. Consequently, conventional type jaw spindles cannot be used because the maximum diameter achievable with the actuators fully extended and the jaws in maximum-opening position is less than the diameter of such rims.

To overcome this problem, the manual adjustment is known of each of the jaws, done by moving and suitably positioning each of the jaws on the respective supporting slides.

Such manual operation nevertheless is often complicated, costly in terms of the time required and not always effective, inasmuch as the operator who has to perform the adjustment can make mistakes, and thereby negatively affect the correct operation of the spindle.

To overcome such drawbacks, the document EP 1 518 718 is known, wherein is described a self-centring gripping device for tyre-changing machines comprising a supporting plate having a plurality of radial slats, equidistant from one another, inside which are inserted sliding relative gripping jaws of a rim.

The jaws are connected to one another by means of a system of levers, so they are always equally distant with respect to the rotation axis of the plate, and are associated with actuator means suitable for causing their translation in a radial direction.

Furthermore, between at least one of the jaws and the actuator means is placed a positioning device suitable for changing the work position of the jaws, with respect to the actuator, without changing its stroke.

In particular, the positioning device comprises a crankshaft with a crank, the button of which is suitable for being received by a bush integral with one of the jaws, and the outer pins of which are connected to operating means.

Special locking means are suitable for locking the crankshaft in two opposite contrasting work positions.

Nevertheless, such self-centring gripping device is not without its drawbacks either.

In particular, the positioning device used is structurally complex and its realization has a significant influence on the manufacturing times and costs of the self-centring gripping spindle of the tyre-changing machine.

Another drawback is represented by the fact that the positioning device used only permits positioning the jaws in two extreme positions and does not therefore permit making a precise adjustment of the position of the gripping jaws in accordance with the specific dimensions of the rim to be locked.

Furthermore, the possibility of only positioning the jaws in two extreme positions makes necessary continuous adjustment operations including in the event of its being necessary to operate in sequence on the rims with different dimensions the one from the other but which, in any case do not have extreme dimensions.

This therefore means a considerable increase in total tyre fitting and/or removal times.

SUMMARY OF THE INVENTION

The main object of the present invention is to provide an appliance for locking the wheel rims for vehicles on repair workshop machines or the like which allows a further adjustment of the position of the jaws, irrespective of the adjustment made by means of the actuators, by means of a solution which is structurally simple, rational, easy and effective to use and which is inexpensive.

Another object of the present invention is to provide an appliance for locking the wheel rims for vehicles on repair workshop machines or the like which allows a precise adjustment of the position of the gripping jaws, which can be made in accordance with the specific dimensions of the rim to be locked.

Another object of the present invention is to provide an appliance for locking the wheel rims for vehicles on repair workshop machines or the like which permits considerably reducing the number of jobs required to adjust the jaws during the fitting/removal operations on rims of different dimensions.

The above objects are achieved by the present appliance for locking wheel rims for vehicles on repair workshop machines or the like, comprising:

a supporting structure associable with a rotation device of a repair workshop machine or the like;

at least two locking jaws for locking the rim of a wheel which are associated with a supporting structure and moving along at least a direction of reciprocal moving close/away between a position of maximum opening, wherein said jaws are arranged at a maximum distance from each other, and a position of minimum opening, wherein said jaws are arranged at a minimum distance from each other;

a movement arrangement associated with said jaws and suitable for moving said jaws between said position of maximum opening and said position of minimum opening;

at least an adjustment device placed between said movement arrangement and at least one of said jaws and suitable for adjusting said position of maximum opening and/or said position of minimum opening;

characterized by the fact that said adjustment device comprises:

at least an adjustment element of a substantially elongated shape, associated with said movement arrangement, revolving around its own longitudinal axis and having at least a threaded portion;

at least a mobile element associated integral with at least one of said jaws and having at least a threaded hole inside which is engaged said threaded portion of the adjustment element, the rotation of said adjustment element around said longitudinal axis being suitable for moving said mobile element on said threaded portion and along a direction of adjustment substantially parallel to said direction of reciprocal moving close/away.

BRIEF DESCRIPTION OF THE DRAWINGS

Other characteristics and advantages of the present invention will become more evident from the description of a preferred, but not sole, embodiment of an appliance for locking wheel rims for vehicles on repair workshop machines or the like, illustrated purely as an example but not limited to the annexed drawings in which.

Figures from 4 to 11 illustrate the operation of the adjustment device of the locking appliance according to the invention.

DETAILED DESCRIPTION OF THE INVENTION

With particular reference to such figures, globally indicated by 1 is an appliance for locking wheel rims for vehicles, particularly used to lock the rim of a wheel on repair workshop machines, such as tyre-changing machine or the like.

The appliance 1 comprises a supporting structure 2 associable with a conventional rotation device A of a machine B.

With reference to a preferred embodiment, shown in the illustrations, the supporting structure 2 can be made up of a plate that can be fixed to the rotation device A of the machine B, suitable for supporting the rim of a wheel.

The appliance 1 also comprises at least two jaws 3 for locking the rim associated with the plate 2 and moving along a reciprocal direction of moving close/away D between a maximum opening position, wherein they are arranged at a maximum distance the one from the other, and a minimum opening position, wherein they are arranged at a minimum distance the one from the other.

Preferably, as shown in the illustrations, the appliance 1 comprises two pairs of jaws 3 which move along respective directions of moving close/away D at right angles the one to the other.

In particular, the plate 2 has four guides 4, made up e.g. of radial slots and angularly equidistant, inside which are fitted sliding respective carriages 5 for supporting each of the jaws 3.

Different supporting structures 2 cannot however be ruled out, having plates with different shapes and dimensions with respect to that shown in the illustrations and having slots 4 for guiding the jaws 3 of different number, conformation and inclination.

The appliance 1 comprises a movement arrangement 6 connected to each of the jaws 3 and suitable for moving the jaws 3 between the maximum opening position and the minimum opening position.

Usefully, the movement arrangement 6 comprises an opportune system of self-centring levers connected to each of the jaws 3 suitable for keeping each of the jaws 3 always at the same distance with respect to a central axis C for the rotation of the plate 2.

With reference to a preferred embodiment, shown in the illustrations, the movement arrangement 6 comprises two linear actuators 7.

The linear actuators 7 can be made up, e.g., of actuator cylinders with fluid operation.

Always with reference to a preferred embodiment, shown in the illustrations, the system of self-centring levers is arranged below the plate 2 and comprises four pairs of connecting rods 8 articulated, at one extremity, to a lower portion of respective carriages 5 and articulated, at the opposite extremities, to the corners of two respective rotatable plates 9.

The rotatable plates 9 are substantially square and are mounted substantially superimposed and idle on a central pin 10 of the plate 2, so the connecting rods 8 of each single pair are symmetrically arranged the one to the other with respect to the direction of moving close/away D of the respective jaw 3.

Advantageously, the appliance 1 comprises at least one adjustment device 11, placed between the movement arrangement 6 and at least one of the jaws 3 and suitable for adjusting the maximum opening position and the minimum opening position of the jaws themselves.

The adjustment device 11 therefore permits adjusting the distance between the jaws 3 according to the size of the rim to be locked, without having to change the stroke of the linear actuators 7 used.

Figure 1:
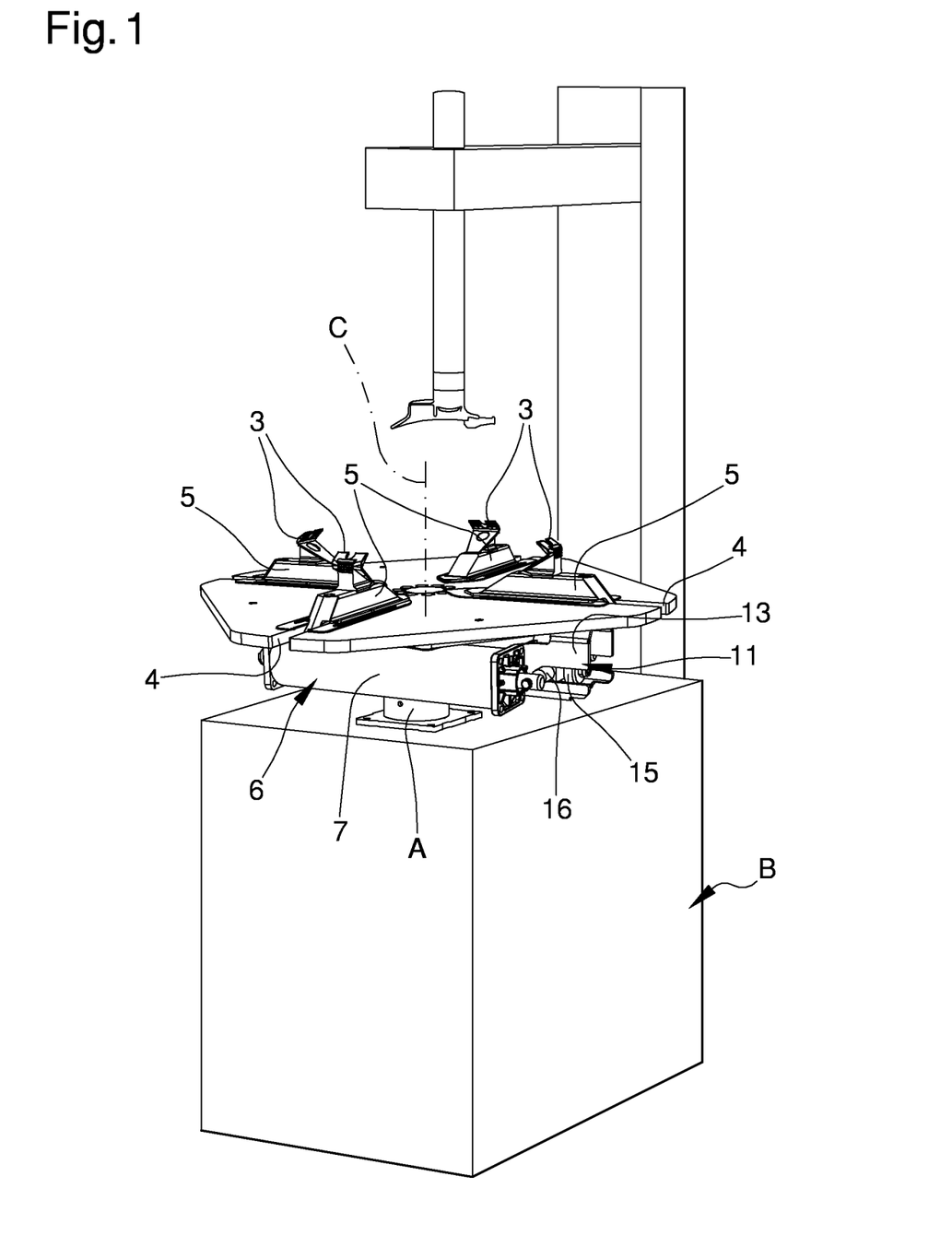
FIG. 1 is an axonometric view of the locking appliance according to the invention arranged on a general tyre-changing machine.
Figure 2:
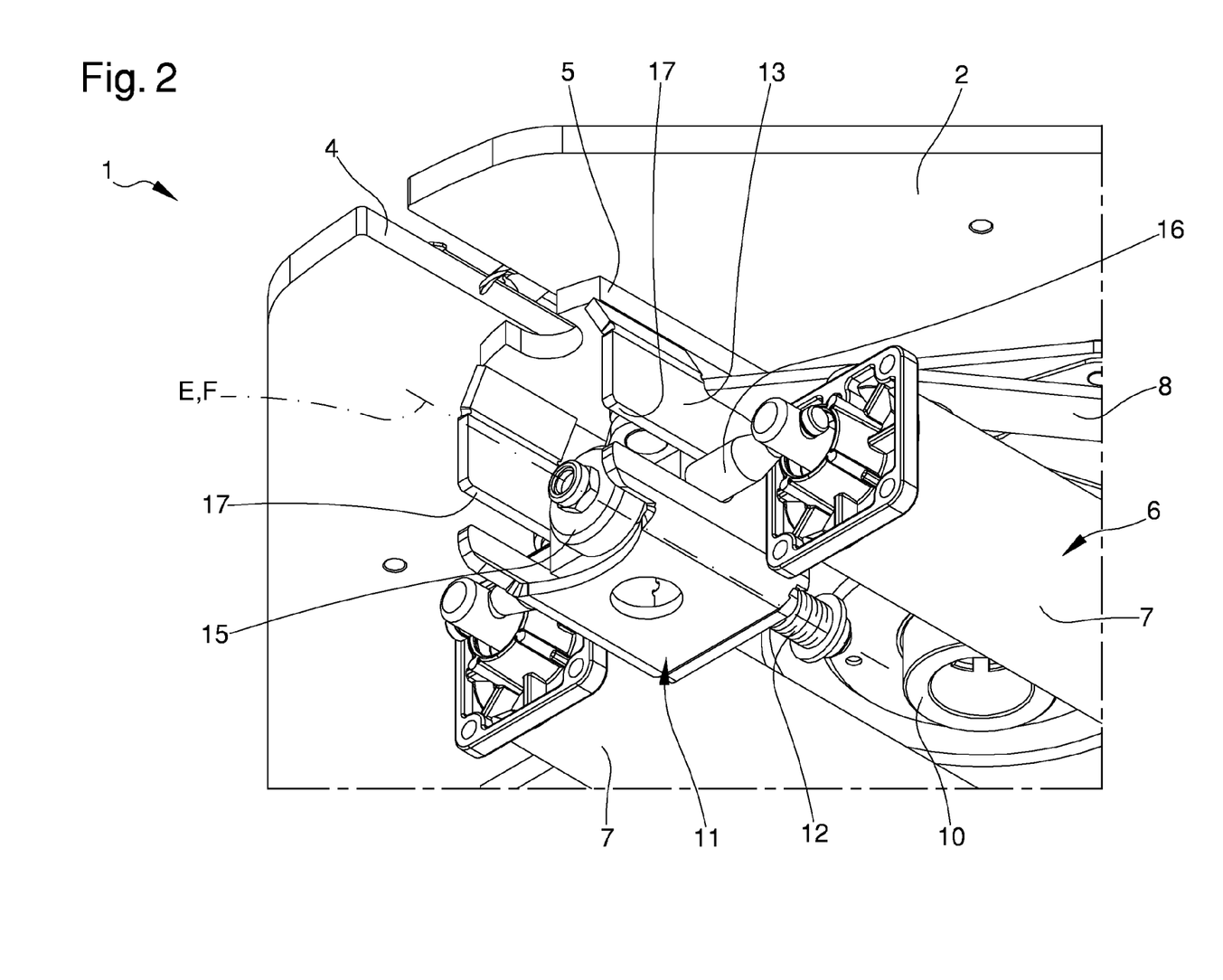
FIG. 2 is an axonometric view of a detail of the locking appliance according to the invention.
Figure 3:
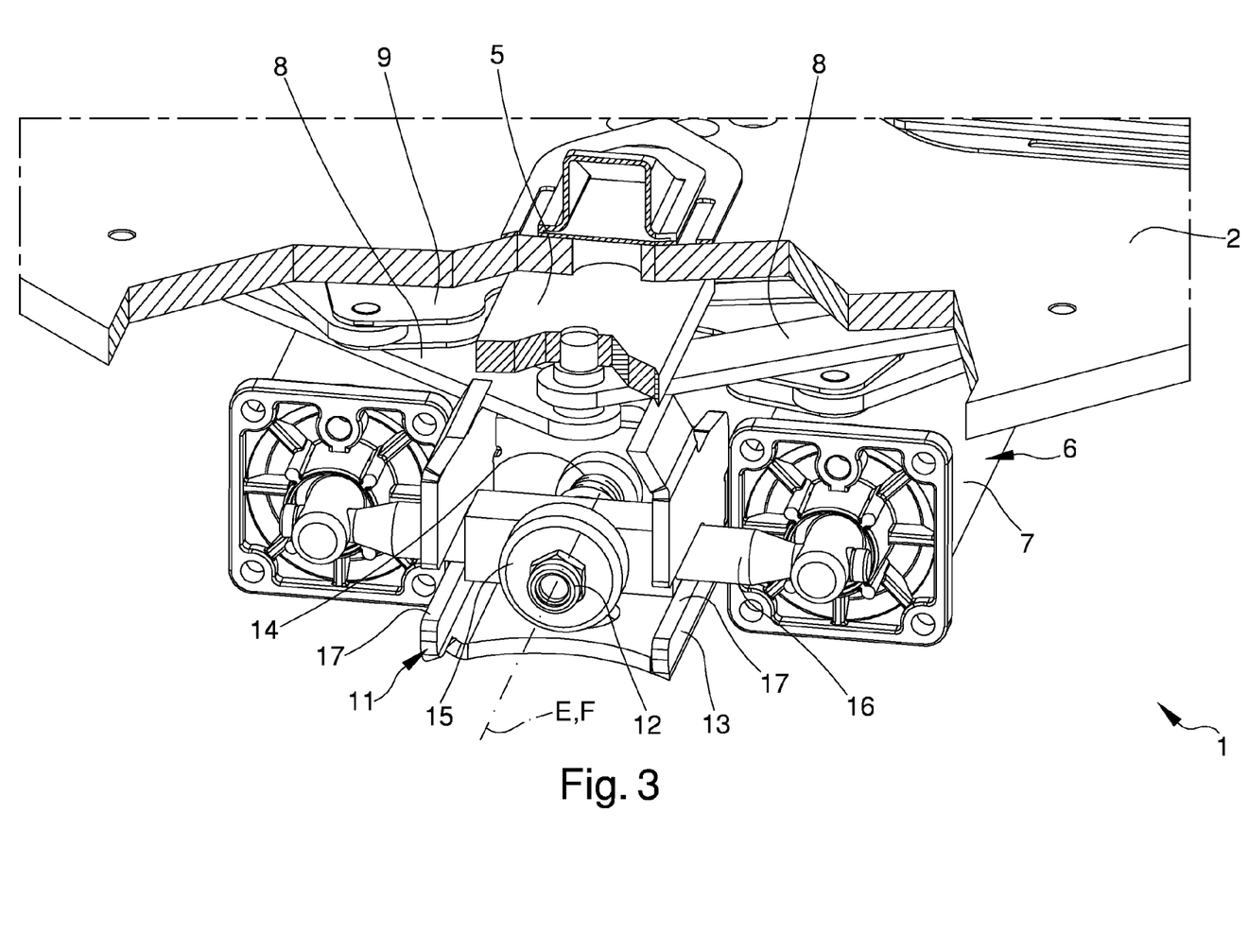
FIG. 3 is an axonometric and partial section view of a detail of the locking appliance according to the invention.
Figure 4:
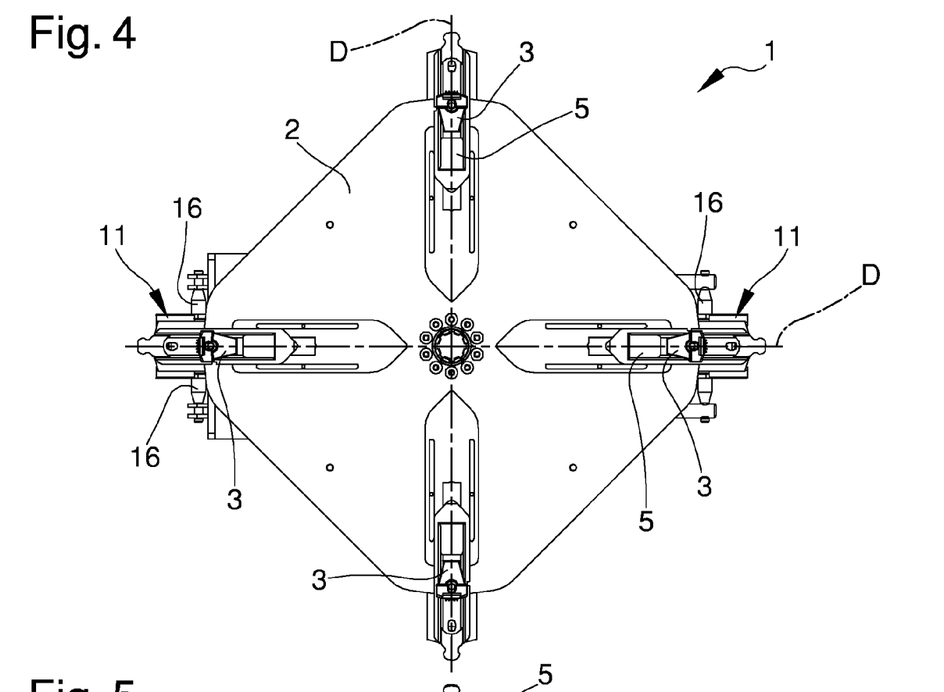
Figure 5:
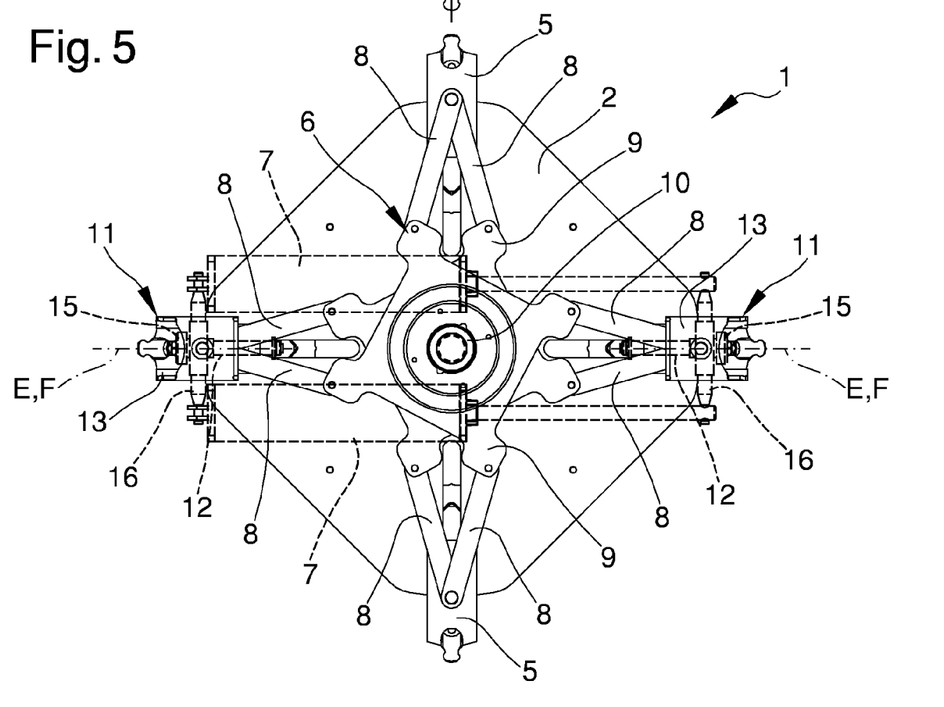

In particular, the adjustment device 11, shown in detail and in a preferred embodiment in the FIGS. 2 and 3, comprises:

one adjustment element 12 with a substantially elongated shape, connected to the linear actuators 7, rotatable around its longitudinal axis E and having at least one threaded portion;

one mobile element 13, fixed integral with the carriage 5 of one of the jaws 3 and having a threaded hole 14 inside which the threaded portion of the adjustment element 12 is engaged.

Advantageously, the rotation of the adjustment element 12 around its longitudinal axis E permits moving the mobile element 13 on the threaded portion, along a direction of adjustment F parallel to the direction of moving close/away of the jaw 3.

In particular, with reference to a preferred but not sole embodiment, the adjustment element 12 can be composed of a pin having at least one threaded section.

Usefully, the adjustment device 11 comprises a gripping element 15 fixed integral to an extremity of the pin 12, arranged so as to be easily reachable and suitable for making it easier for the operator to grip and rotate the pin itself.

In particular, the gripping element 15 can be composed of a specific knob fixed integral to the extremity of the pin 12 turned outwards.

The pin 12 is connected axially revolving to a connection element 16 fixed to the linear actuators 7.

In particular, the connection element 16 is made up of a body of elongated shape having two opposite extremities fixed to the extremities of each of the pistons of the linear actuators 7, respectively.

The connection element 16 also comprises a central portion having a through hole inside which the pin 12 is inserted axially rotatable.

A first and a second thrust bearing, fastened to the pin 12 in correspondence to sections opposite the through hole on the connection element 16, prevent the movement of the pin 12 with respect to the connection element 16 along the longitudinal axis E.

The mobile element 13 is substantially cup-shaped and the pin 12 is at least in part housed inside it.

Usefully, the adjustment device 11 comprises a guide arrangement 17 for guiding the translation of the mobile element 13 with respect to the pin 12.

With reference to the particular embodiment shown in the illustrations, the guide arrangement 17 is made of a pair of straight and elongated slots 17 extending on walls of the mobile element 13 opposite with respect to the pin 12, along a direction parallel to the direction of adjustment F, inside which are fitted sliding respective portions of the connection element.

Advantageously, in a preferred embodiment and as shown in the illustrations, the appliance 1 comprises two adjustment devices 11, placed in between the linear actuators 7 and respective and opposite jaws 3.

In particular, a second adjustment device 11 has the respective connection element 16 with the opposite extremities fixed to the extremities of each of the cylinders of the linear actuators 7, respectively.

The presence of a second adjustment device 11, in particular, permits a greater adjustment stroke of the jaws 3.

The operation of the appliance 1 is described below and is schematically shown in the figures from 4 to 10.

In particular, it is pointed out that in the figures from 4 to 9, the appliance 1 is shown with the linear actuators 7 fully extended and, therefore, with the jaws 3 separated from one another in the maximum opening position.

Figure 10:
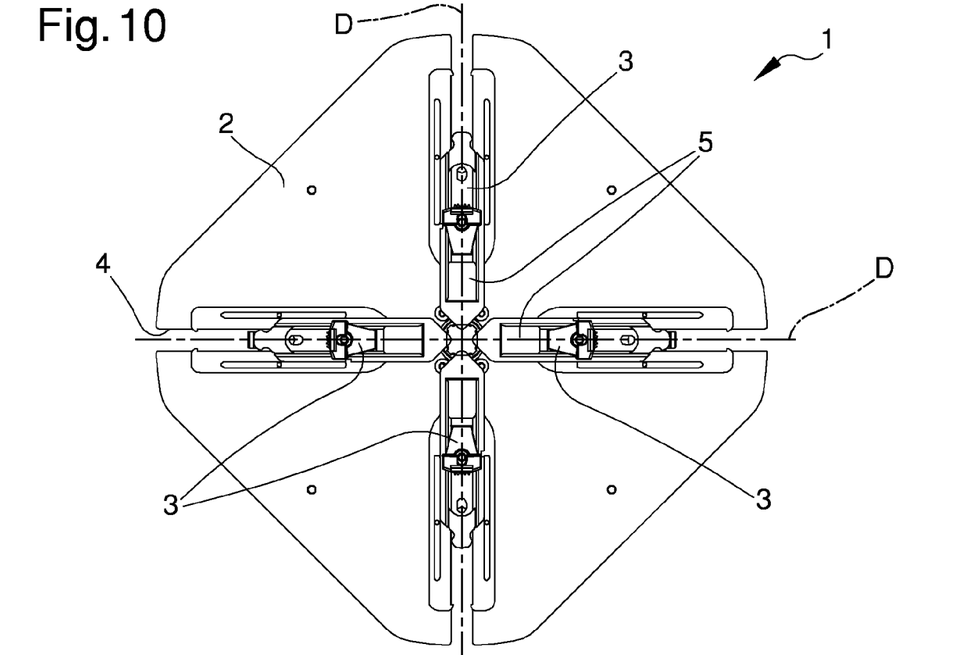
Figure 11:
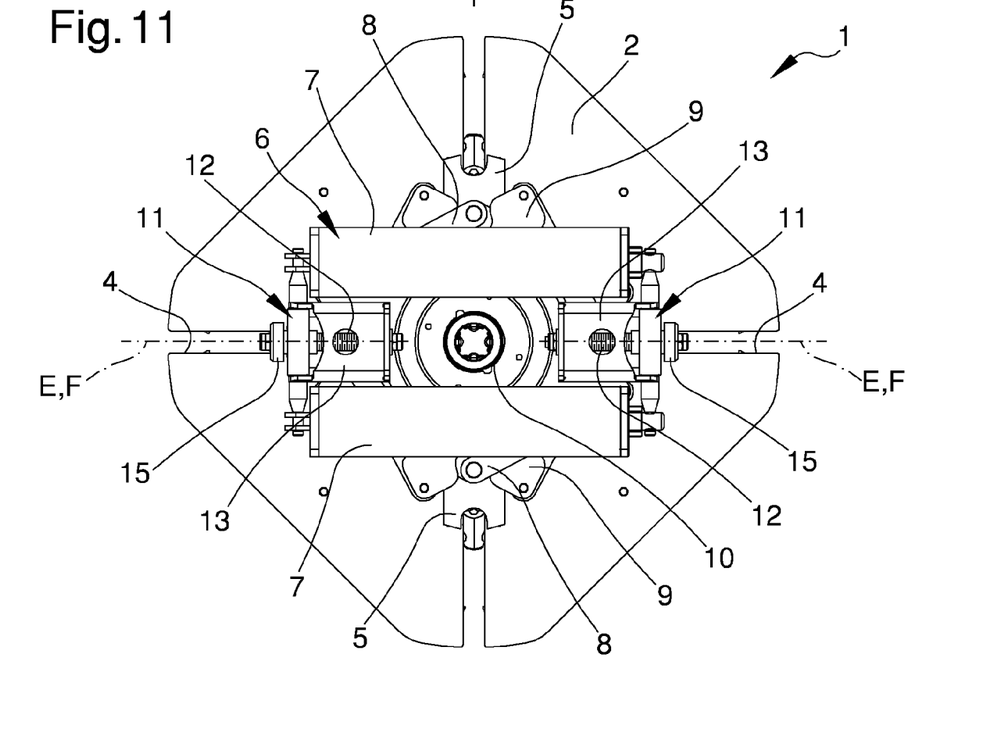

In the FIGS. 10 and 11, on the other hand, the appliance 1 is shown with the linear actuators 7 fully collected up and, therefore, with the jaws 3 close to one another in the minimum opening position.

Starting from an initial position wherein the jaws 3 are arranged at a determinate distance from one another (FIGS. 4 and 5) it may be necessary to make the fine adjustment of the position of the jaws 3, so as to adapt the appliance 1 to rims of different dimensions.

In this case, an operator can e.g. adjust one of the adjustment devices 11, unscrewing the pin 12 up to end of stroke, moving the mobile element 13 along the direction of adjustment F and towards the centre of the plate 2.

Figure 6:
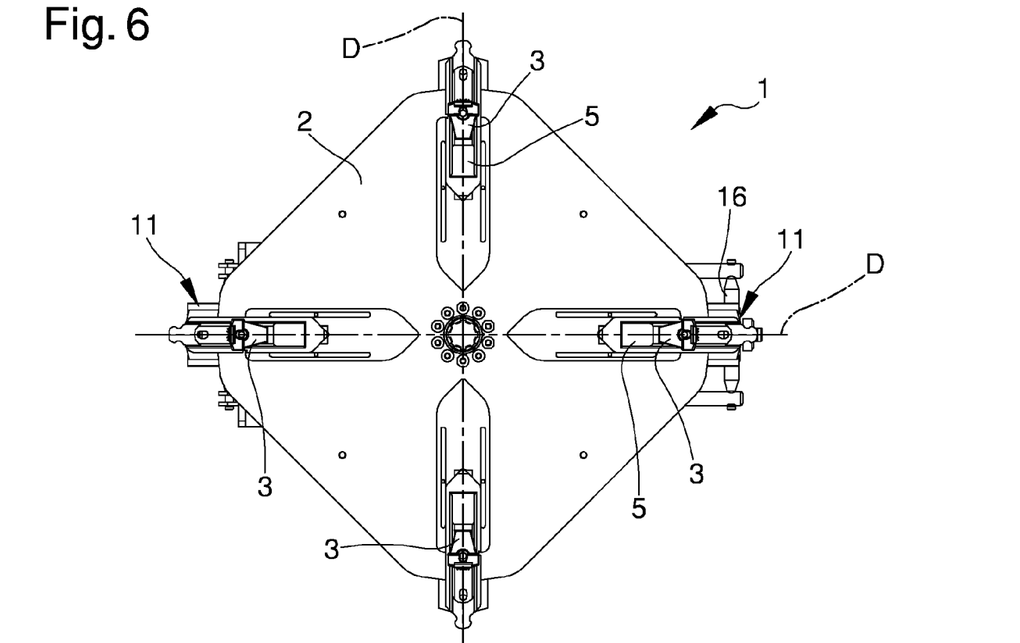
Figure 7:
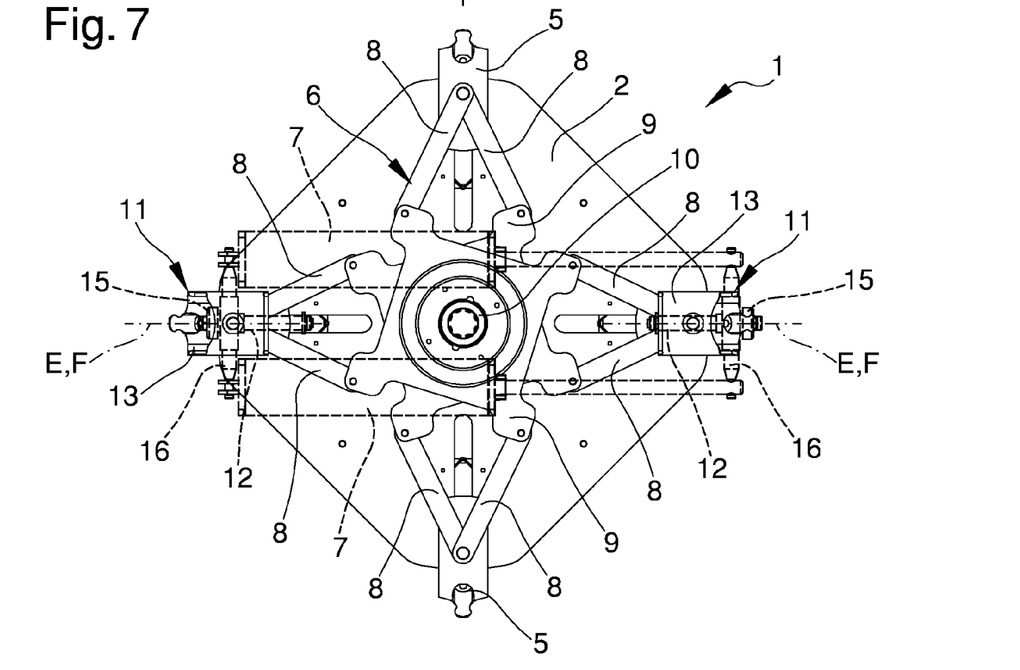

The movement of the mobile element 13 corresponds to the movement of the carriage 5 to which it is fixed and, consequently, all the jaws 3 are moved closer to one another being connected to one another by the self-centring lever system (FIGS. 6 and 7).

If necessary, the operation of the second adjustment device 11 permits further moving the jaws 3 closer to one another.

For example, in this case, the operator can adjust the second adjustment device 11, by unscrewing the pin 12 up to end of stroke, moving the second mobile element 13 along the direction of adjustment F and towards the centre of the plate 2.

Figure 8:
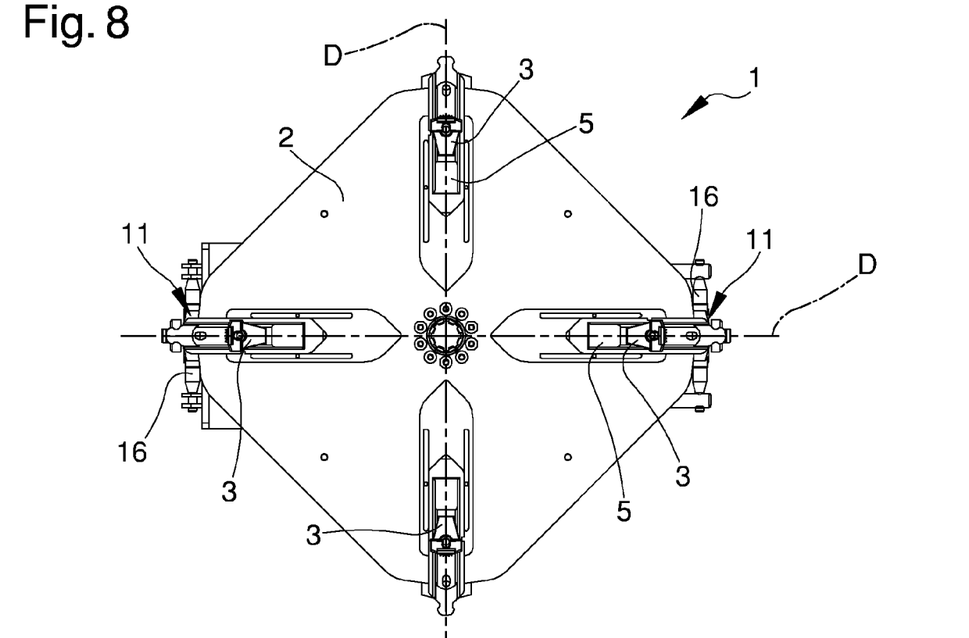
Figure 9:
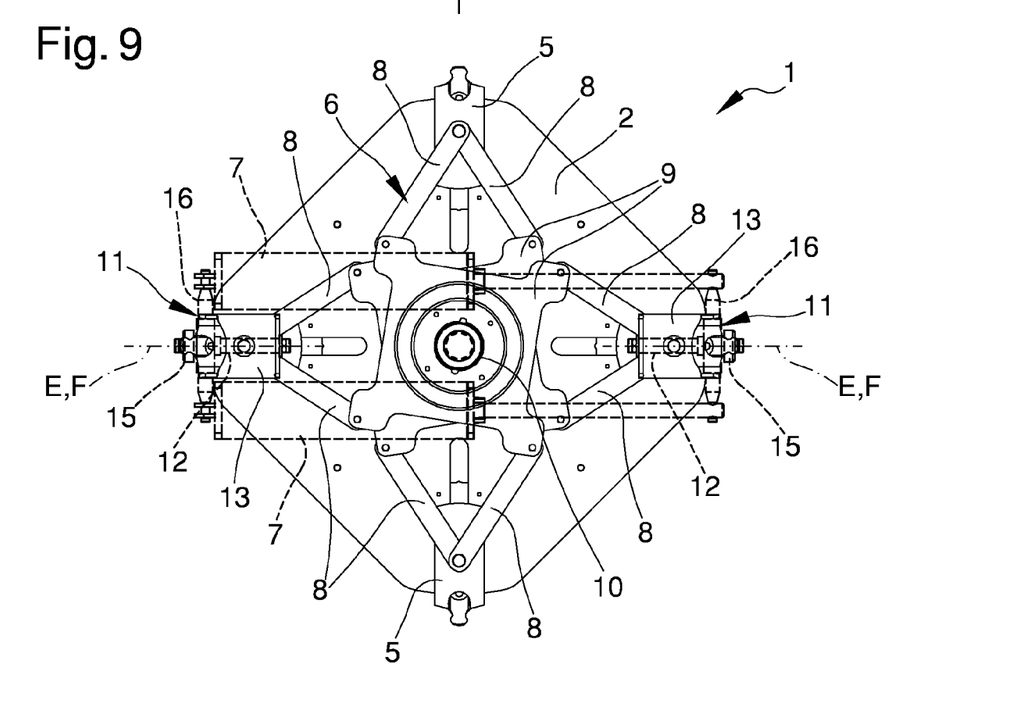

The movement of the second mobile element 13 corresponds to a further movement of the carriage 5 to which it is fixed and, consequently, to a further movement of all the jaws (FIGS. 8 and 9).

For completeness, in the FIGS. 10 and 11 are shown views from above of the appliance 1 with the linear actuators 7 completely collected up and with the jaws 3 in the minimum opening position and as close up as possible to one another.

It has in point of fact been ascertained how the described invention achieves the proposed objects.

In particular, the adjustment device 11 permits a further adjustment of the position of the jaws 3, irrespective of the adjustment made by means of the linear actuators 7, by means of a solution which is structurally simple, rational, easy and effective to use and inexpensive.

Furthermore, the adjustment device 11 permits accurately adjusting the position of the gripping jaws 3, which can be performed according to the specific dimensions of the rim to be locked.

Finally, unlike what occurs with known solutions such as that described in the document EP 1 518 718, the particular adjustment device 11 permits considerably reducing the number of jobs required to adjust the jaws during the fitting/removal operations on rims of different dimensions.

The invention claimed is:

1. Appliance for locking wheel rims for vehicles on repair workshop machines, comprising:
    a supporting structure associable with a rotation device of a repair workshop machine;
    at least two locking jaws for locking the rim of a wheel which are associated with the supporting structure and moving along at least a direction of reciprocal moving close or away between a position of maximum opening, wherein said jaws are arranged at a maximum distance from each other, and a position of minimum opening, wherein said jaws are arranged at a minimum distance from each other;
    a movement arrangement associated with said jaws and suitable for moving said jaws between said position of maximum opening and said position of minimum opening;
    at least an adjustment device placed between said movement arrangement and at least one of said jaws and suitable for adjusting at least one of said position of maximum opening and said position of minimum opening; characterized by the fact that said adjustment device comprises:
    at least an adjustment element of a substantially elongated shape, associated with said movement arrangement, revolving around its own longitudinal axis and having at least a threaded portion;
    at least a mobile element associated integral with at least one of said jaws and having at least a threaded hole inside which is engaged said threaded portion of the adjustment element, the rotation of said adjustment element around said longitudinal axis being suitable for moving said mobile element on said threaded portion and along a direction of adjustment substantially parallel to said direction of reciprocal moving close or away.

2. Appliance according to claim 1, characterized by the fact that said adjustment device comprises at least one gripping element associated integral with an extremity of said adjustment element.

3. Appliance according to claim 1, characterized by the fact that said adjustment device comprises at least a connection element placed between said movement arrangement and said adjustment element, said adjustment element being associated axially revolving with said connection element.

4. Appliance according to claim 3, characterized by the fact that said movement arrangement comprises at least a linear actuator and by the fact that said connection element is associated integral with at least a portion of said linear actuator.

5. Appliance according to claim 4, characterized by the fact that said movement arrangement comprises at least two linear actuators and by the fact that said connection element has at least two substantially opposite extremities associated integral with respective portions of said linear actuators.

6. Appliance according to claim 1, characterized by the fact that said adjustment device comprises a guide arrangement for guiding the translation of said mobile element with respect to said adjustment element.

7. Appliance according to claim 3, characterized by the fact that said adjustment device comprises a guide arrangement for guiding the translation of said mobile element with respect to said adjustment element and by the fact that said guide arrangement comprises at least an elongated slot which extends onto said mobile element along a direction substantially parallel to said direction of adjustment and inside which is fitted sliding at least one portion of said connection element.

8. Appliance according to claim 7, characterized by the fact that said guide arrangement comprises at least one pair of said elongated slots, which extend on portions of said mobile element substantially opposite said adjustment element, along a direction substantially parallel to said direction of adjustment and inside which are fitted sliding respective portions of said connection element.

9. Appliance according to claim 7, characterized by the fact that said mobile element is substantially cup-shaped, said adjustment element being housed at least in part inside said mobile element.

10. Appliance according to claim 1, characterized by the fact that it comprises at least two of said adjustment devices placed between said movement arrangement and two of said jaws substantially opposite to each other.

11. Appliance according to claim 1, characterized by the fact that said supporting structure comprises at least a plate associable with said rotation device of the repair workshop machine and suitable for supporting at least one rim of a wheel.

12. Appliance according to claim 1, characterized by the fact that said supporting structure comprises at least two guides made on said plate, inside which are fitted sliding respective carriages for supporting said jaws.

13. Appliance according to claim 1, characterized by the fact that said movement arrangement comprises at least a self-centering system of levers connected to each of said jaws and suitable for keeping each of said jaws at the same distance to a central axis of rotation of said supporting structure.

14. Appliance according to claim 2, characterized by the fact that it comprises at least two of said adjustment devices placed between said movement arrangement and two of said jaws substantially opposite to each other.

15. Appliance according to claim 2, characterized by the fact that said supporting structure comprises at least a plate associable with said rotation device of the repair workshop machine and suitable for supporting at least one rim of a wheel.

16. Appliance according to claim 2, characterized by the fact that said supporting structure comprises at least two guides made on said plate, inside which are fitted sliding respective carriages for supporting said jaws.

17. Appliance according to claim 2, characterized by the fact that said movement arrangement comprises at least a self-centering system of levers connected to each of said jaws and suitable for keeping each of said jaws at the same distance to a central axis of rotation of said supporting structure.

* * * * *